United States Patent Office 2,729,599
Patented Jan. 3, 1956

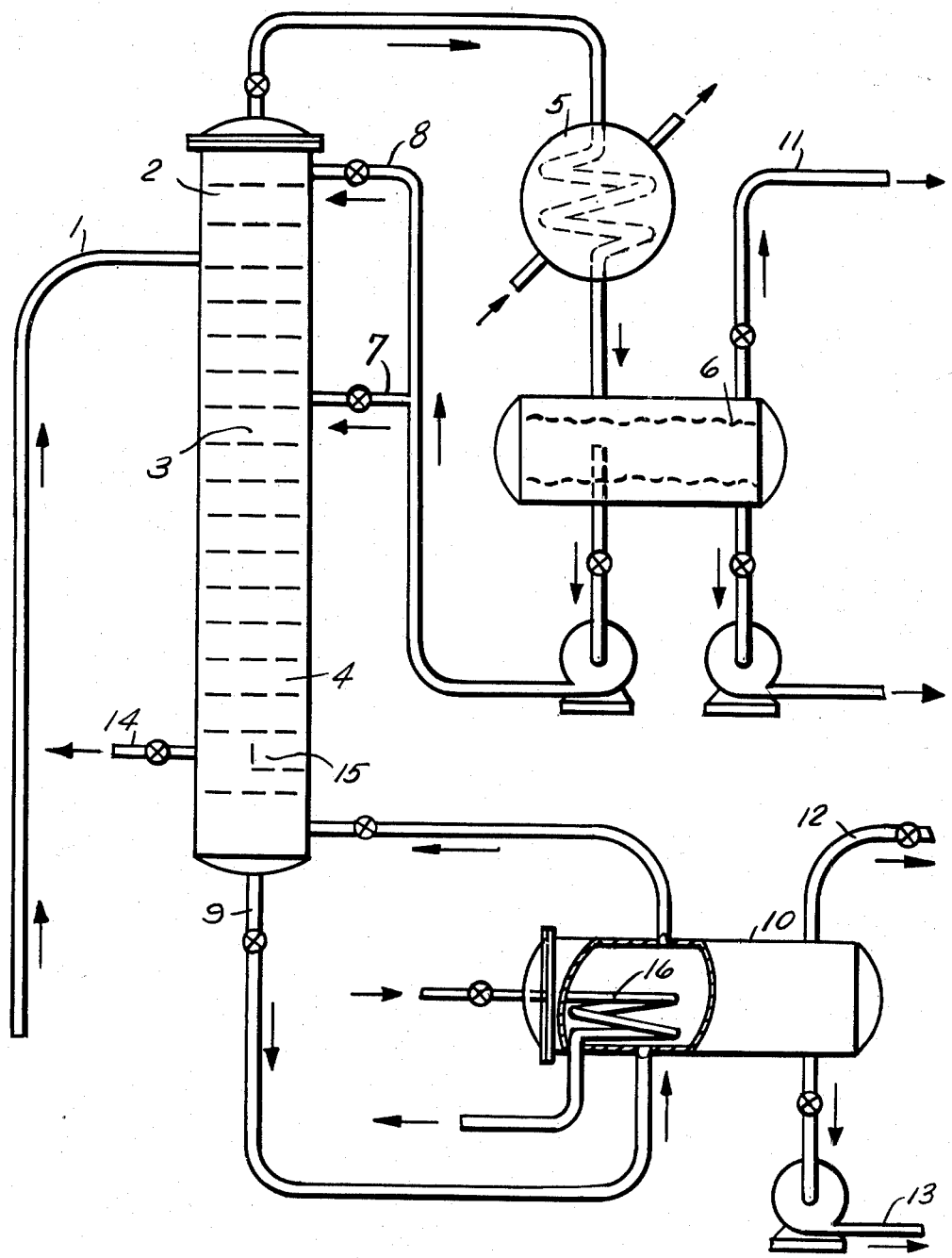

2,729,599

DEHYDRATION OF MALEIC ACID TO ANHYDRIDE

Ernest O. Ohsol, Cranford, William C. Sussky, Linden, and Leland K. Beach, Mountainside, N. J., assignors to Esso Research and Engineering Company, a corporation of Delaware Application August 2, 1948, Serial No. 41,975

1 Claim. (Cl. 202—42)

This invention relates to a process for making organic anhydrides from the corresponding acids and particularly to producing anhydrides from aqueous solutions of such acids.

It has long been known that the most generally applicable method for the preparation of organic anhydrides is the direct dehydration of the corresponding acids. This dehydration can be carried out in a variety of ways.

Typical of these is the commonly employed procedure used for commercial manufacture of maleic anhydride. Benzene is oxidized with air over a catalyst in the vapor phase to yield a mixture of products containing maleic anhydride and small amounts of various impurities. Other raw materials besides benzene may be used such as normal butenes. Water is used to scrub the product gases. From this step there is obtained an aqueous solution of maleic acid. The solution is then concentrated preferably under vacuum to reduce formation of fumaric and malic acids. The solution is then crystallized, and the resulting crystals separated and heated to distill off the maleic anhydride as a relatively pure product. This anhydride is recovered by partial condensation, leaving water vapor and some uncondensed anhydride. This latter fraction is recovered in a total condenser and recycled as acid. Maleic anhydride prepared by this method is accompanied by considerable amounts of fumaric acid and other undesirable by-products. These impurities are produced in substantial amounts even when great precautions are taken to avoid overheating, and are due to the relatively long heating times required. They create a difficult and expensive purification problem.

In general it is most convenient to obtain the organic acids as aqueous solutions or slurries. It has now been found that concentrated solutions of the acids can be converted to pure anhydrides in a unified operation. This operation can be carried out in a practical way using a distilling column of a modified conventional design. A packed column or a bell-cap plate tower is satisfactory. An inert organic liquid is continuously refluxed within the column. The acid solution is introduced into the column at some intermediate point. The section of column above the point of feed functions primarily to separate an azeotrope of the water with the liquid being used. This mixture is removed, condensed, the layers separated, the water layer being discarded, the entrainer layer being reused and returned to the column as reflux preferably partly at the top of the column and partly below the feed.

Below the feed inlet a mixture of the acid and liquid entrainer flows downward against the rising vapors. These vapors comprise entrainer and decreasing amounts of steam as the liquid proceeds down the tower. The rising vapors strip out the water of solution and carry it upward, thus producing a mixture of acid and liquid entrainer. As this slurry proceeds on down the tower the water of hydration of the acid is also removed by vaporous entrainer and the anhydride formed dissolves in the liquid entrainer. The remainder of the lower portion of the column acts as a stripping section to remove entrainer and give a tower bottoms product of essentially anhydrous, solvent-free liquid anhydride containing a small amount of various higher boiling impurities including acids such as fumaric acid. These impurities may be removed in a redistillation step. As an alternate method of operation, the substantially pure anhydride may be removed as a vapor and condensed as pure product. A major portion of the maleic anhydride vapor generated must be returned up the column.

A wide variety of inert organic liquids can be used as entrainers in the column. It is of course necessary that the liquid employed have a reflux temperature which is high enough at the pressure being used to insure rapid and substantially complete dehydration of the acid to the anhydride. The liquid should be capable of forming an azeotrope containing a reasonably high water percentage to effect efficient water removal. Suitable liquids are the xylenes, benzene, toluene, ethylbenzene, isooctane, and various non-olefinic hydrocarbon fractions, obtained in refinery and cracking processes and boiling substantially below maleic anhydride. The liquid need not necessarily be of the hydrocarbon type since other non-reactive liquids such as certain water immiscible ethers, ketones and halogen compounds, for example, chlorobenzene, diethyl ketone and BB'dichlorodiethyl ether are also useful. These may include small amounts of high boiling solvents for fumaric acid. Mixtures of non-reactive solvents may also be used. The liquid used may or may not be miscible with the organic anhydride. If the liquid is miscible, then it should preferably boil below the anhydride being produced to facilitate its separation from the product.

Isomerization, as for example, of maleic acid to fumaric acid, may be minimized by the use of reduced pressure and temperature. The pressure under which the column is operated should be so chosen, relative to the boiling point of the solvent entrainer, that the temperature in the region below the feed is sufficiently high to give a rate of acid dehydration which is rapid relative to the rate of isomerization, and at the same time the temperature in the bottom of the column is not excessive. Ordinarily, pressures somewhat above or below atmospheric can be used satisfactorily.

For operations where it is desired to take overhead the maleic anhydride after dehydration, for example, to separate it from tars, a liquid forming an azeotrope with maleic anhydride, such as n-decane may be employed in a second column. In such cases, it is of advantage if this liquid is miscible with maleic anhydride at high temperatures but immiscible at lower temperatures, thus permitting phase separation for easy recovery of solvent from the condensed mixture of maleic anhydride and solvent, in a manner similar to the separation of water from the condensed water-solvent azeotrope.

If desired, a catalyst may be used to accelerate the dehydration of acid to anhydride, provided the catalyst used does not unduly increase isomerization or show other undesirable effects. For example, an acidic dehydration catalyst such as sulfuric acid, phosphoric acid, or toluene sulfonic acid can be used to speed up the dehydration of maleic acid to the anhydride. Any such acidic materials used are preferably introduced into the column at a point where free water is substantially absent. Acids in the presence of water tend to promote isomerization of maleic acid to fumaric acid and consequently cause a lowering of anhydride yield.

The operation of this invention results in a number of outstanding advantages. Primarily, the desired anhydride product is obtained directly from an aqueous solution of the organic acid in a single step. It is advantageous that the acid is subjected to dehydration conditions substantially in the absence of excess water, thus minimizing undesirable side reactions such as isomerization.

It is of additional advantage that the starting feed is the one which is usually obtained in common industrial practice and does not require extensive or unusual treatment for use in the process. This means, for instance, that a maleic acid in water solution, such as is obtained in standard commercial operations, need not be extensively concentrated or crystallized before proceeding directly to form the anhydride.

Another advantage is that only small amounts of the entrainer liquid are necessary as it can readily be separated from the water and recycled through the dehydration zone with very little overall losses.

By virtue of the countercurrent dehydration system, it is possible to obtain complete dehydration of all the maleic acid entering the apparatus in a single pass, in contrast to single stage coil and drum systems which have been proposed. Also, the amount of solvent vaporized per unit of water removed is reduced significantly in a countercurrent system.

The yield of anhydride is excellent and in some cases may actually be considerably higher than that obtained by other methods in addition to the good purity of the product.

It is intended that this invention be applicable to such anhydride forming organic acids as phthalic, succinic, and maleic and in particular to acids which are sensitive to prolonged heating. Mixtures of acid feeds can be converted to the corresponding anhydrides by this method.

The operation of the process can be more easily understood from the following example and by reference to the accompanying flow sheet diagram.

A water solution of maleic acid of 40 weight percent concentration, is fed into a bell-cap column at inlet 1. Preferably this inlet is located at an intermediate point in the upper portion of the column. Within the column is xylene under reflux, heat being supplied by a reboiler 10.

In the upper part 2 of the column there are xylene-water vapors which are removed overhead as the azeotrope. These vapors are liquefied by means of condenser 5 and sent to a separator tank 6 from which the water layer is removed and the xylene layer is recycled to the column through inlets 7 and 8. Traces of non-condensible vapors are removed through pressure control line 11. It is especially desirable to introduce a substantial portion of the xylene reflux at inlet 7, below the feed inlet, to insure complete dehydration of the acid before it reaches the bottom of the column. This portion of the solvent may be prevaporized and injected as vapor, thus supplying a major portion of the heat required for operation of the column.

Immediately below the feed inlet, in section 3 of column 1, a slurry of maleic acid flows down the column countercurrent to ascending vapors of xylene. The column is so designed that the liquid is maintained in a high degree of turbulence to favor uniform distribution of the phases. Precautions should be taken to avoid pockets of stagnant liquid and channeling. After the water of solution has been removed by the xylene vapors, the maleic acid readily undergoes dehydration to the anhydride. In section 4 of the column, there is a solution of maleic anhydride in xylene. This section of the column functions as a stripping zone to remove the xylene from the product. From bottom outlet 9 there is removed molten, anhydrous relatively pure maleic anhydride which is taken to reboiler 10 containing heating coil 16. As an alternate design, heating coil 16 may be located in the bottom of the column. The reboiler 10 supplies the heat necessary for the operation of the tower through the medium of vaporized maleic anhydride; when part of the solvent is introduced as vapor below the feed at inlet 7, the reboiler need only supply the heat necessary to strip the solvent from the maleic anhydride.

As product there may be removed anhydrous, solvent-free liquid maleic anhydride through line 13, or, if preferred, there may be recovered pure maleic anhydride vapor from line 12 or from the lower part of the column through line 14. If the latter procedure is followed, it is desirable to have a spray shield 15 in the lower portion of the column.

If the anhydride is removed as vapor, a flux, essentially non-volatile under the conditions in the column, may be used to keep the bottoms in a fluid state. This fluxing material is preferably a non-volatile compound such as the phthalate esters or other high boiling stable esters. A side stream of bottoms may be withdrawn as a purge and sent to an auxiliary column where the sludge and fumaric acid may be removed as bottoms and the overhead returned to the dehydration tower reboiler system. The flux may also be vaporized at high temperature in purging the sludge, and the recovered flux returned to the main dehydration column.

What is claimed is:

In a continuous process for the preparation of maleic anhydride which comprises continuously introducing an aqueous solution of maleic acid at a feed inlet into an upper portion of a fractionating column, said column having a dehydration zone below said feed inlet, continuously refluxing within the upper part of said column an inert organic liquid capable of azeotroping with water and lower boiling than said anhydride, removing from the top of said column an azeotropic vapor composition of water and of said inert organic liquid, continuously passing the maleic acid as it is freed of aqueous solvent downwardly through said dehydrating zone, the improvement which comprises introducing a sufficient additional amount of said inert organic liquid into the column at below said feed inlet to insure complete dehydration of the acid and dissolve the anhydride as it is formed in the dehydration zone, continuously passing downwardly from said dehydration zone the resulting solution of maleic anhydride in a residual portion of the inert organic liquid into a stripping zone where the inert organic liquid is vaporized to form vapors passed up through the dehydrating zone, removing anhydrous maleic anhydride as a bottoms liquid from the column below said stripping zone removing the anhydrous maleic anhydride as vapor from said bottoms liquid, and maintaining in said bottoms liquid a non-volatile high-boiling stable organic liquid compound as a fluxing material.

References Cited in the file of this patent

UNITED STATES PATENTS

| | | |
|---|---|---|
| 1,424,138 | Bailey | July 25, 1922 |
| 1,815,802 | Schleicher | July 21, 1931 |
| 1,966,853 | Duornikoff | July 17, 1934 |
| 2,050,234 | Othmer | Aug. 4, 1936 |
| 2,166,556 | Spence | July 18, 1939 |
| 2,340,490 | Porter | Feb. 1, 1944 |
| 2,462,444 | Weiss | Feb. 22, 1949 |
| 2,683,110 | Rousseau | July 6, 1954 |